United States Patent [15] 3,670,313
Beausoleil et al. [45] June 13, 1972

[54] DYNAMICALLY ORDERED MAGNETIC BUBBLE SHIFT REGISTER MEMORY

[72] Inventors: William F. Beausoleil, Poughkeepsie; David T. Brown; Ernest L. Walker, both of Wappingers Falls, all of N.Y.

[73] Assignee: International Business Machines Corporation, Armonk, N.Y.

[22] Filed: March 22, 1971

[21] Appl. No.: 126,822

[52] U.S. Cl...................340/174 TF, 307/224 R, 340/174 SR
[51] Int. Cl.....................................G11c 11/14, G11c 19/00
[58] Field of Search................340/174 TF, 174 SR; 307/224

[56] References Cited

UNITED STATES PATENTS

| | | | |
|---|---|---|---|
| 3,290,511 | 12/1966 | Sims, Jr. | 340/174 SR |
| 3,408,505 | 10/1968 | Coolidge, Jr. et al. | 340/174 SR |
| 3,454,939 | 7/1969 | Michaelis | 340/174 SR |
| 3,596,261 | 7/1971 | Perneski | 340/174 TF |

*Primary Examiner*—Vincent P. Canney
*Attorney*—Hanifin & Jancin and James E. Murray

[57] ABSTRACT

This specification discloses a bubble domain memory in which data is arranged for immediacy of access in accordance with its last use. The memory comprises a plurality of parallel shift registers in which data can be accessed in parallel. In other words, each of the shift registers contains a bit of a page or word so that by the performance of one shifting operation all of the bits of the page or word can be accessed. Data in each shift register is arranged in its order of last use so that the access position K of a shift register having K bit positions contains the last bit of information used and the position K−1 preceding the access position K in the shift register contains the bit of data used just previously to the data in the access position K and so on. In these shift registers the shift positions are arranged in loops for shifting the data between the positions of the shift register. Two such loops are provided, one of the loops contains all the shift positions so that data in any position in the shift register can be shifted into the access position K of the register for reading or writing. The other loop contains all the positions of the shift register but the access position K. This second loop is for reordering the data in the shift register in order of last use after data has been shifted into the access position K for reading or writing by the first loop.

8 Claims, 6 Drawing Figures

INVENTORS
WILLIAM F. BEAUSOLEIL
DAVID T. BROWN
ERNEST L. WALKER

BY James E. Murray
ATTORNEY

DYNAMICALLY ORDERED MAGNETIC BUBBLE SHIFT REGISTER MEMORY

BACKGROUND OF THE INVENTION

The present invention relates to shift registers, particularly shift registers used to store a large amount of data.

In copending application Ser. No. 103,201 filed in the names of William F. Beausoleil, et al. and entitled "Shift Register Storage Unit" a shift register memory with K positions for the storage of data is described. In this memory data is stored in the shift register in order of last use so that the last bit of information accessed is in the last or the access position K of the register and can be read out of the memory without shifting and the next to the last bit of information accessed is stored in the K−1 position or the position preceding the K position so that is only has to be shifted once to the access position K of the memory in order to read it out and so on. It was found that by storing data in this manner any desired page of information could be reached with considerably less shifts on the average than would be necessary if the data had been stored randomly in the shift register. It is well known that magnetic bubble domain memories are aptly suited for use in shift register memories in that they consume little space, are nonvolatile and are most efficiently fabricated when arranged in shift registers containing a large number of register positions.

Therefore, in accordance with the present invention a new magnetic bubble domain shift register is provided in which data can be arranged in order of last use. In this shift register, the number of shift positions K corresponds to the number of pages or words to be stored and the shift positions are arranged for shifting data between each position in loops which selectively include or exclude the access position K of the register. Two shift loops are provided, one loop contains all K shift positions of the shift register and is for shifting data from any position to the access position K of the register for reading or writing. The other loop excludes the access position K and is for reordering the data in the register in its order of last use after data has been shifted into the access position K by the first loop.

Because of its configuration the shift register of the present invention takes advantage of valuable features of both the mentioned copending application and of magnetic bubble domain memories in general. First of all the obvious assets of bubble domain memories such as small size and novolitility are certainly used. However in addition more subtle advantages of magnetic memories are also used. For instance, with the present invention magnetic bubble domain shift registers with a large number of shift positions can be used without running into, on the average, extremely long access times for the data. Of course, large bubble domain shift registers are very desirable since they reduce fabrication costs for the memory and cut down on the number of access and support circuits necessary. Furthermore, by fabricating shift registers in accordance with the present invention, the natural bidirectional shifting ability of magnetic bubble domain memories is taken advantage of to provide both of the shifting loops for the register without any significant increase in the size of the shift register on the platelet.

Therefore, it is an object of this invention to provide a magnetic domain shift register storage in which pages of data are arranged in order of use so that the most recently accessed page may be shifted into the access position on a priority basis.

Another object is to provide such shift register units in which the reordering is effected dynamically within the unit and without external controls.

A further object is to provide such shift register units which are capable in use of dynamically reordering all or some of the pages thereof to permit shifting of data to the access position in the exact order in which they were last previously accessed.

A still further object is to provide such units having aforesaid advantages in which the registers and their controls are relatively simple and inexpensive to produce.

DESCRIPTION OF THE DRAWINGS

These and other objects, features and advantages of the invention will be apparent from the following more particular description of the preferred embodiment of the invention as illustrated in the drawings, of which.

DESCRIPTION OF THE PREFERRED EMBODIMENT

The invention will first be explained with reference to the simplified diagrams of FIGS. 1 and 2, as this will facilitate understanding of the more detailed operating circuitry of the other figures.

EXPLANATION OF SIMPLIFIED DIAGRAMS

Figure 1:
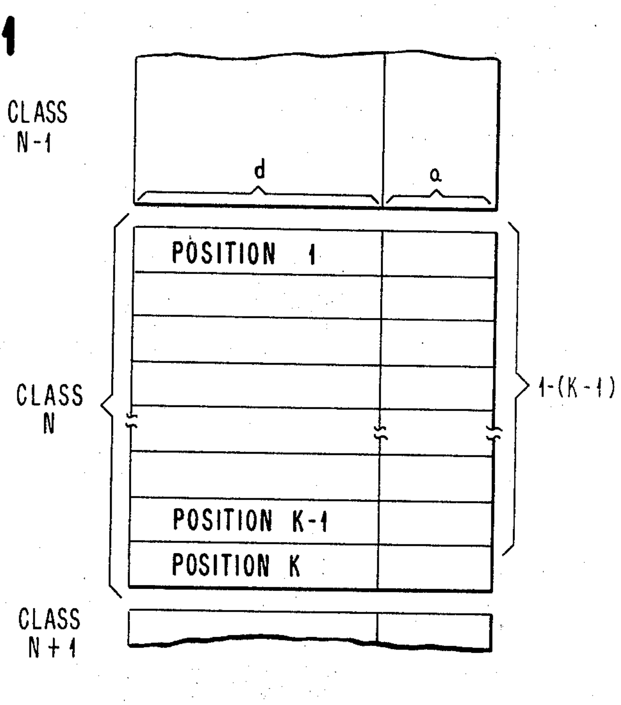
FIG. 1 is a diagrammatic layout explanatory of shift register arrangement in storage according to one embodiment of the present invention.

FIG. 1 partially illustrates in diagram three congruent classes of storage registers N, N+1 and N−1 each of which is equipped for separate access and for page reordering in accordance with the invention. Each class is made up of shift registers which extend and shift longitudinally of the figure, each register having K shift positions, K being equal to the page storage capacity of the class. Each side-by-side shift position of these registers contains all the bits of a page. There are therefore a group of registers $d$ equal in number to the number of data bits per page, plus a group $a$ equal to the number of address bits per page. The registers are shifted in unison so that the pages are shifted successively from one position to the next. Position K is the page position equipped for address testing and read-write accessing.

Figure 2:
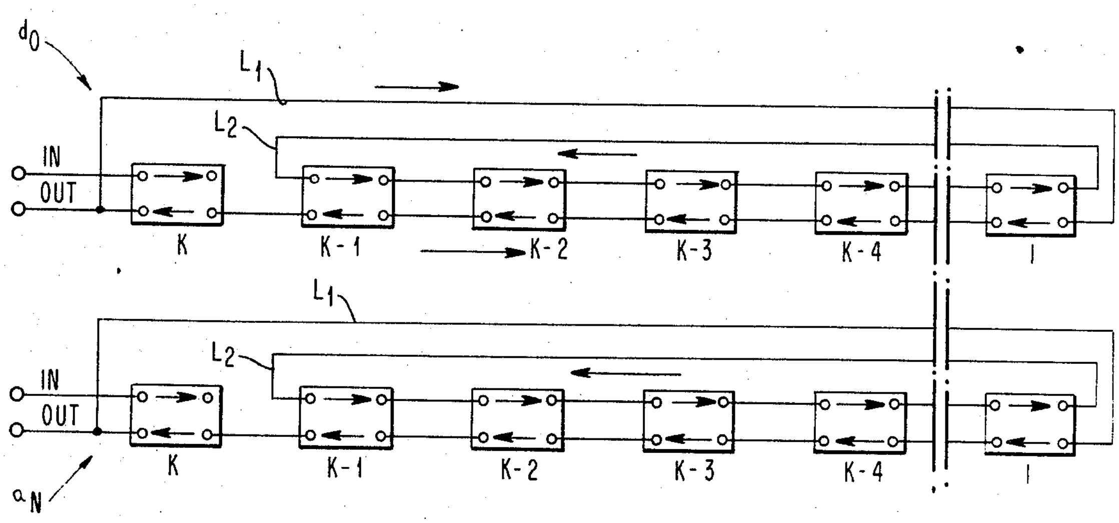
FIG. 2 shows by symbol certain positions of two of the K position shift registers of FIG. 1 and illustrates the manner of shifting and input-output connections.
Figure 3:
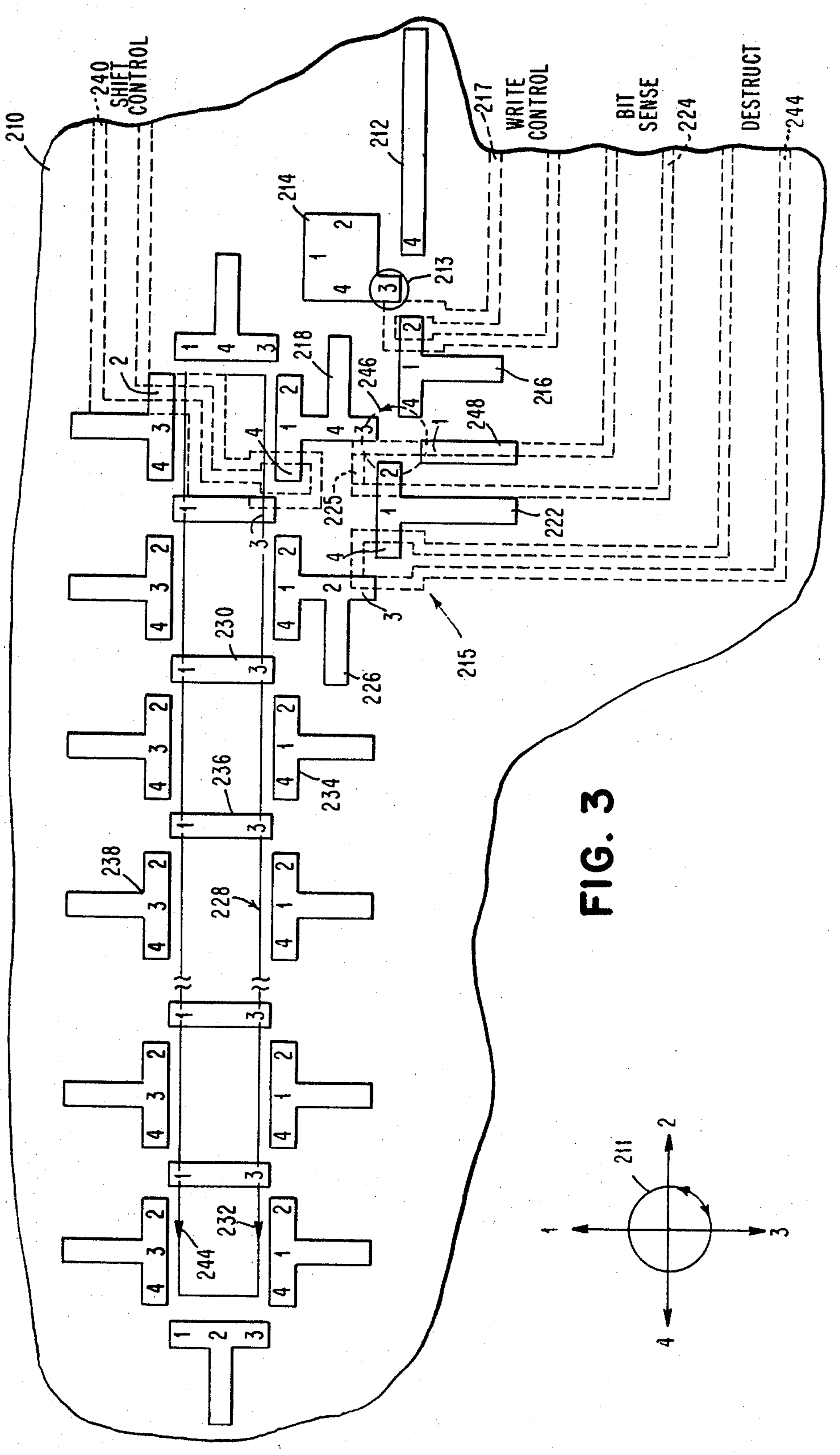
FIG. 3 is a layout for one of the magnetic bubble domain shift registers fabricated in accordance with the present invention.

FIG. 2 illustrates the manner of shifting and accessing the pages of a class of registers. In this figure the rectangles with oppositely directed arrows and line connections are symbolical of the topological units or storage cells of a two way static shift register such as shown in FIG. 3 and hereinafter described. Only two of the registers of the class are indicated, these being the first order data register $d_0$ and the opposite end register $a_X$ for the page address field. It will be understood that between the two indicated registers are the remainder of the data registers $d$ and all of the address registers $a$ of FIG. 1, these having the same number of storage cells as the two registers shown and the same shift connections for shifting all registers in unison. Also, the cells between 1 and K−4 to K of the two registers shown are omitted.

In FIG. 2, all registers are connected for shifting in two different loops, a loop $L_1$, left shift in the figure, which includes the K position, and a loop $L_2$, right shift in the figure, which includes all positions except K. Read and write access is had to each bit position of a page in the K position as indicated by the lines labeled "OUT" and "IN," respectively. Therefore, the class may be initially loaded with pages by alternately writing in the cells of position K and then shifting their contents on shift in loop $L_1$, K times. The first two pages entered, which will end up in positions K and K−1 when loading is completed.

A request for access to the class in the form of the address of the desired page is compared with the address bits of the page in position K, read out to the comparison circuitry. If there is a match, the requesting unit is signaled, there is no shifting, the read/write circuits to position K are conditioned and the requested access is obtained. However, if there is no match on the first address comparison from position K, the registers are shifted once on loop $L_1$, putting the page last in position K in position 1 of the class and the page last in position K—1 in position K. The address bits of the new page in position K are compared with those of the requested page and, if a match is obtained, access is provided as in the case of a match on the first comparison. If there is no match, the search continues by alternately shifting in loop $L_1$ and comparing the address of the page newly entering position K until a match is obtained.

Any match after the first comparison not only provides access to the matched page in position K as explained above but also causes register positions 1 through K—1 to shift in the reverse direction in loop $L_2$ until the page originally in position K reaches position K—1.

Thus, on any match after the first comparison, the class is reordered to the extent that the page in access position K when the request was received (then the last previously accessed page and now next to last) is exchanged for the requested page but located in position K—1 where it is closest in the direction of shift to the comparison-access position K. Similarly, the page in position K—1 when the request was received, if it was not the requested page, is now in position K—2, and all pages then in positions between K—1 and the position containing the requested page are now one further order removed from the access position K in the direction of shift in loop $L_1$. Thus, regardless of how they were originally ordered, once all pages of a class have been accessed they are all reordered in the direction of shift in loop $L_1$, in terms of recency of access, from the newest in position K to the oldest in position 1. Since the K position is excluded from the reordering shift loop $L_2$, the requested page therein remains accessable despite shifting in that loop.

In a shift register storage system wherein the pages are maintained in a fixed sequence which the system of FIG. 2 would be without the reverse shift loop $L_2$, the access time is the number of shifts required to locate the requested page times the shift rate, and the average access time is $(K-1)/2$ times the shift rate, where $K$ is the number of pages in the class. In the reordered system according to FIG. 2 the access time is the number of shifts required to locate the requested page times the shift time plus the number of shifts required to place the last previously accessed page in position K-1 times the shift time. Nevertheless, the system according to FIG. 2 can reduce the average access time very substantially as compared with a fixed sequence system where certain pages of a class are referenced with much greater frequency than others, which is usually the case with program-controlled storage access.

For example, assume a program using only 10 of 4,096 pages of a class. After all 10 pages have been referenced once in the system according to FIG. 2 they will be located in positions K to K—9. If they are thereafter accessed by the program with equal frequency, the average access time would be nine times the shift time as compared with 2,048 times the shift time in the fixed sequence storage system. If the program used a few of the 10 pages with much greater frequency than the others, the average access time in the system according to the invention would be still further reduced.

In utilizing a memory made up of separately accessible page classes equipped for page reordering in accordance with this invention it is desirable that certain pages which it is realized will be used much more than others, or will be used exclusively by a number of programs, be distributed for storage in several of the classes. In this way, frequently used pages will segregate toward the comparison-access position so as to be more quickly accessible than if they were all contained in a single class;—the time for accessing a limited number of pages used by certain programs is also reduced. For instance, if the 10 pages of the example given above were distributed two each to five classes, the average access time after each had been once accessed would be reduced to at most twice the shift time. In addition, such recommeneded distribution reduces the likelihood of immediate repeated requests for access to the same class.

In order to obtain the advantage of priority searching of a limited group of pages which are used most frequently, some data processing systems have been equipped with extra registers in which such pages are stored in duplicate. The page addresses of these extra registers are searched first and the class which they partially duplicate is searched only if the requested address is not found in the extra registers. By rather elaborate controls, the pages in the extra registers are updated according to recency of use.

The system of the invention according to FIG. 2 and other figures yet to be described has many advantages over this prior system. One such advantage is greatly simplified hardware and controls. For example, the extra registers and page duplicating readout equipment from the registers or positions of the main class are eliminated. The shift connections are simply, dynamically controlled. Operation is simplified. Problems of changing pages stored in duplicate are avoided. There is no double searching of the same page as may occur in the prior system. And in the system of FIG. 2 all pages of a class are searched on a priority based on recency of use once all pages have been accessed.

EXPLANATION OF THE BUBBLE DOMAIN SHIFT REGISTER

FIG. 3 shows a K position closed-loop shift register in accordance with the present invention. An overlay pattern including T and I permalloy bars for the shift register stages, conductor patterns for control, and the associated domain platelet 210 is shown. The platelet 210 as all such platelets from which magnetic domain shift registers of this type are made is under the influence of a bias magnetic field directed perpendicular to the plane of the platelet. The bubbles are moved from one permalloy pattern to the other by sequentially magnetizing the permalloy pattern closest to the bubble in a cyclic fashion. This is achieved by the rotating magnetic field 211 which is in the plane of the platelet 210 and which can be rotated in either a clockwise or counterclockwise direction. The drawing contains numbers on the permalloy patterns which correspond to the numbers for the in-plane field direction and illustrate where a bubble resides along any one of the permalloy patterns when the in-plane field is directed in the correspondingly numbered direction. It is assumed that initially there is no data stored in the register and the description therefore begins with a description of how data is initially stored in the register, proceeds to how the data can thereafter be read out or written into the register, and finally covers how the data can be ordered into the order of most recently used data residing nearest the access position.

The extended permalloy T bar 212 functions as a nucleating element. This nucleating bar 212 is twice the length of any other bar in the shift register. Because of this added length this bar 212 can be used to generate the mother bubble, 213, for the register. This is because it saturates at a lower field strength than the other patterns in the register, thus allowing the generation of a bubble on bar 212 by the rotating field 211 without causing the generation of bubbles at other points in the register. Therefore as the field rotates in a counterclockwise direction into the direction 4 a bubble is formed at point 4 on the nucleating bar 212. As the field continues to rotate in a counterclockwise direction this bubble is attracted to position 3 on a permalloy bubble generating plate 214. Once in position 3 the bubble 213 forms the mother bubble from which all other bubbles to be used in the memory will be generated.

From the bubble generating plate 214 bubbles are transferred to the accessing stage 215 of the memory and from there into the other positions of the memory. To see how this is done let us assume that there is no data stored in the memory and the field 211 is being rotated in a counterclockwise direction. Furthermore let us assume that a "1" is to be written into the register. If this is the case the mother bubble 213 is then drawn towards two 2 positions, one 2 position on the bubble generating plate 214 and the other 2 position on the write control T bar 216. As the field continues to rotate the mother bubble 213 stretches and eventually snaps leaving a bubble in the write control T bar 216. This places a "1" in the write control T bar to be inserted into the access position 215 of the register. To place a "0" in the write control T bar 216 a control current is applied to the write control printed wiring pattern 217 in a manner to oppose the field generated by the write control T bar when the rotating field is in the 2 direction. Therefore the mother bubble 213 is not drawn towards the write control T bar 216 and no bubble is in the 2 position of the write control T bar. Therefore, it can be seen that by controlling current in the write control wiring pattern 217 it can be determined whether a "1" or a "0" is placed on the write control T bar 216. If a bubble is placed on the write control T bar 216 a "1" has been generated. If no bubble is placed on the write control T bar 216, a "0" has been generated.

Continued rotation of the magnetic field 211 in the counterclockwise direction shifts the field to the 3 position causing the bubble on the T bar 216 if there is one, to be placed into the primary permalloy pattern 218 of the access stage 215 of the shift register. The field continues rotating in a counterclockwise direction placing the bubble into the 2 position where it enters the access position T bar 222. This point on the bar is the sense point for the memory chain. As the bubble crosses the bit/sense lines 224 under the T bar 222 it causes a flux change in the bit/sense lines which can be sensed by a change in the resistance of a magneto-resistive element 225 in the line. This sensing during the initial write cycle assures that the proper data is being written into the cell since it provides a means to determine whether a bubble is or isn't present in the 2 position when it is or isn't supposed to be.

The data in the access position or the K position of this K bit shift register must be placed in the K—1 position of the shift registers. This is done by continued rotation of the field in the counterclockwise direction so that the bubble is moved out of the sensing position 2 of the access position T bar 222 across the top of the T bar to the 4 position and on to the 3 position of the exit permalloy pattern 226 for the access position. When the bubble arrives in the 1 position on the exit pattern 226 it leaves the access position 215 of the register and enters the first position of the register. At this point it is in the main loop 228 of the register and as the field continues to rotate in a counterclockwise direction the bubble moves in the main loop of the register in the direction of the arrow 230 transferring from the first position of the register to the second position to the third position and so on. Or in other words the bubble continues from the exit pattern 226 to the I bar 230 to T bar 234 to I bar 236 and so on in the sequence of the bubble position numbers along the bottom row of T bars and then the top row of T bars. This continues until this bit of information is placed in the 2 position on the entrance permalloy pattern 218 for the access position where it is in the K-1 position of the shift register. When this occurs data has been stored in the 2 position in each of the peripheral T bars of the main loop of the memory with the exception of the 2′ position on the exit pattern 226. To fill the exit pattern 2′ position the rotating field is reversed when the final bubble for the main loop 228 is placed in the 4 position of the exit pattern 226. The field 211 is then rotated in the clockwise direction until the bubble is placed in the 2′ position to fill the register and the register is full. With the register full the data can be left stationary in the register under the influence of the magnetic bias field until it is ready to be accessed.

To read data from any bit of information stored in the shift register, say for instance, stored at bit position 2 on T bar 238, the rotating magnetic field is again rotated in the counterclockwise direction shifting the data from position 2 of T bar 238 to position 2 on the input pattern 218 for the access position 215 of the memory. In this position the bit of data being accessed is in the K—1 position of the memory. To remove this bit of data from the main loop 232 and place it into the access position, a control pulse is applied to the shift control printed circuit pattern 240. This causes a field which opposes and cancels the field produced at position 4 of the input pattern for the access stage when the rotating field is oriented in direction 4. The bubble is therefore diverted towards the position 4′ in the access stage 215 instead of continuing on in a straight pattern to position 4 in the main loop 228. As the field continued to rotate the bubble goes in sequence from position 4′ to position 3 in the input pattern 218 and from position 3 in the input pattern to position 2 in the T bar pattern 222 where it is sensed by the detection of a resistive change in bit/sense line pattern 224 as previously described. Once sensed the bubble continues down the T bar pattern 222 to position 4 of the T bar 222 where a pulse can selectively be or not be applied to the destruct winding pattern 224 to respectively destroy or not destroy the bubble. If the data is not to be destroyed as in the case where the read data is to be used again, no pulse is applied to the winding pattern 244 and the data is placed back in the main loop 228 when the next access is made. However, when new data is to be written into the bit position a pulse is applied to the destruct pattern 244 to destroy the data. With the data destroyed new data is placed into the access position 215 in the manner previously described in connection with the initial loading of the register and simultaneously with the movement of the accessed data from position 2 to position 4 on the T bar. In doing this let us again assume that a "1" is to be written into the register. If this is the case, the mother bubble 213 is drawn towards two 2 positions, one 2 position on the bubble generating plate 214 and the other 2 position on the write control T bar 216. As the field continues to rotate the mother bubble 213 stretches and eventually snaps leaving a bubble in the write control T bar 216. This places a "1" in the write control T bar to be inserted into the access position 215 of the register. To place a "0" in the write control T bar 216 a control current is applied to the write control printed wiring pattern 217 in the manner to oppose the field generated by the T bar when the rotating field is in the 2 direction. Therefore the mother bubble 213 is not drawn towards the write control T bar 216 and no such bubble is provided in the write control T bar 216.

Once data has been rewritten into the access position the data in the main loop 228 of the shift register must be reordered in order of last use. This is accomplished by reversing the direction of rotation of the field 211 to the clockwise direction. This requires that all the data in the main loop be moved in the direction 224 the same number of shifts as required to move the data into the access position in direction 232. When the rotation is so reversed the data in the main loop 228 starts moving in the direction indicated by arrow 224 until the data has been reordered in the proper sequence. At the same time, data in the access position continuously flows around loop 246 between the 2 position on the access position T bar 222, the 3 position on the input pattern 218, the 4 position on bubble generating T bar 216 and the 1 position on I bar 248. Thus it can be seen with the shift register of FIG. 3 how data can be shifted to the access position for reading and writing and while the data in the access position is maintained there the other data can be reordered.

The arrangement shown takes advantage of the inherent bidirectional nature of movement of bubbles in the bubble domain shift register and provides the two data transferring loops without requiring any significant increase in area on the platelet for the shift register. Furthermore, because of the data ordering arrangement described herein very large magnetic bubble domain loops can be used with on the average very short access delays when compared with data which is randomly arranged in such registers. This permits very efficient fabrication of the bubble domain registers.

Figure 4:
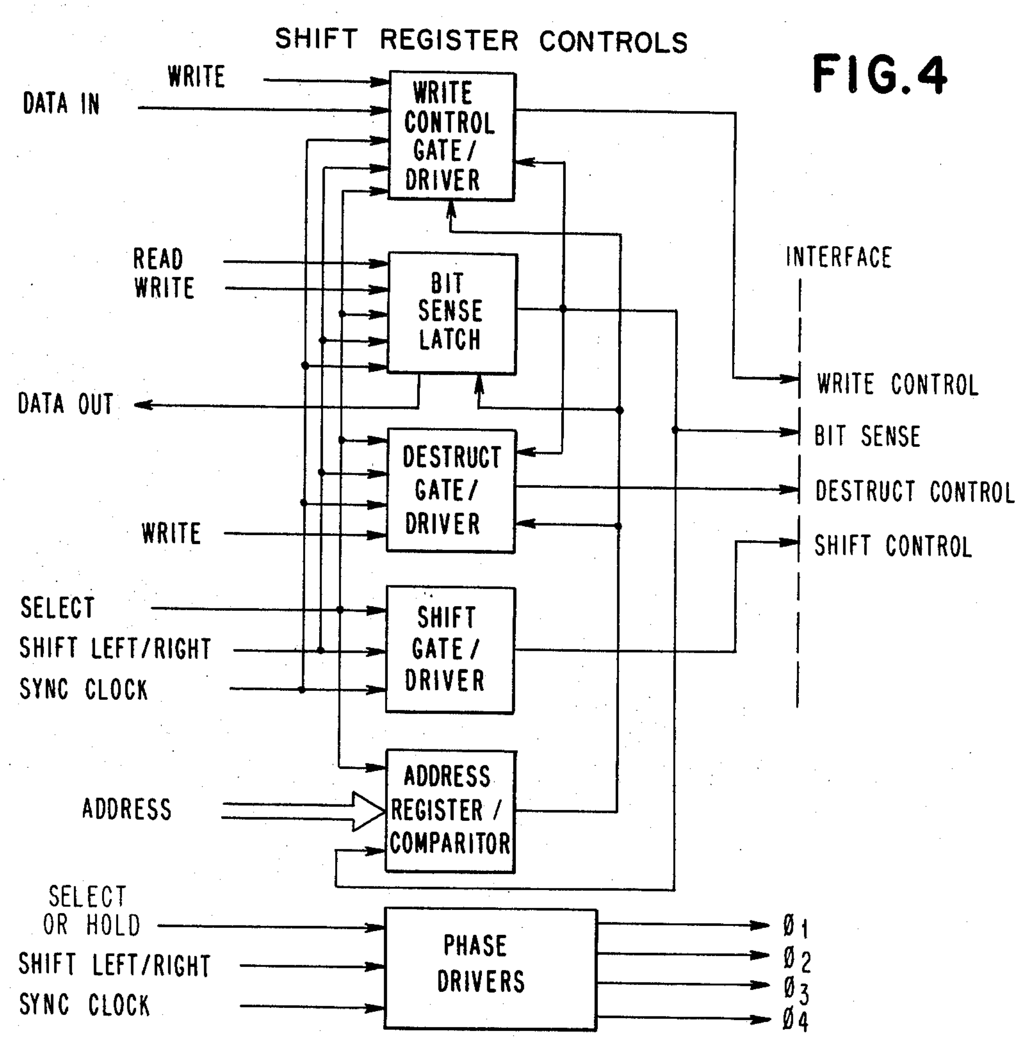
FIG. 4 is a block diagram of the control and access circuits for the bubble shift register shown in FIG. 3.

FIG. 4 of the drawings is a block diagram of the circuits for generation and detection of the electrical signals required to access the shift register of FIG. 3. The blocks shown here are standard drivers, latches and comparators and are not shown in detail since they do not constitute part of the present invention.

Figure 5A:
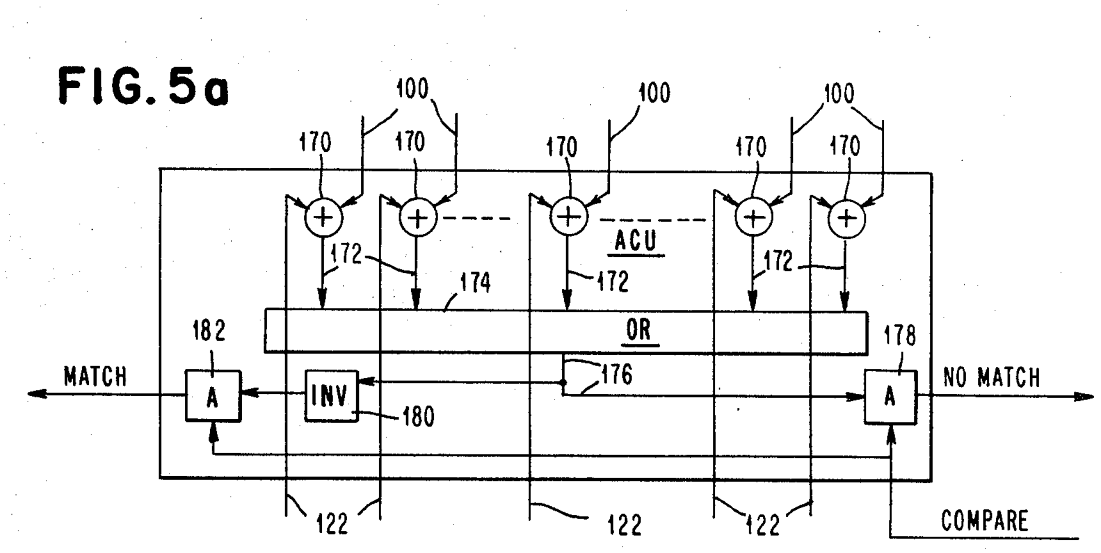
FIG. 5A diagrams comparison circuitry which may be used in the Address Comparison Unit of FIG. 5.
Figure 5:
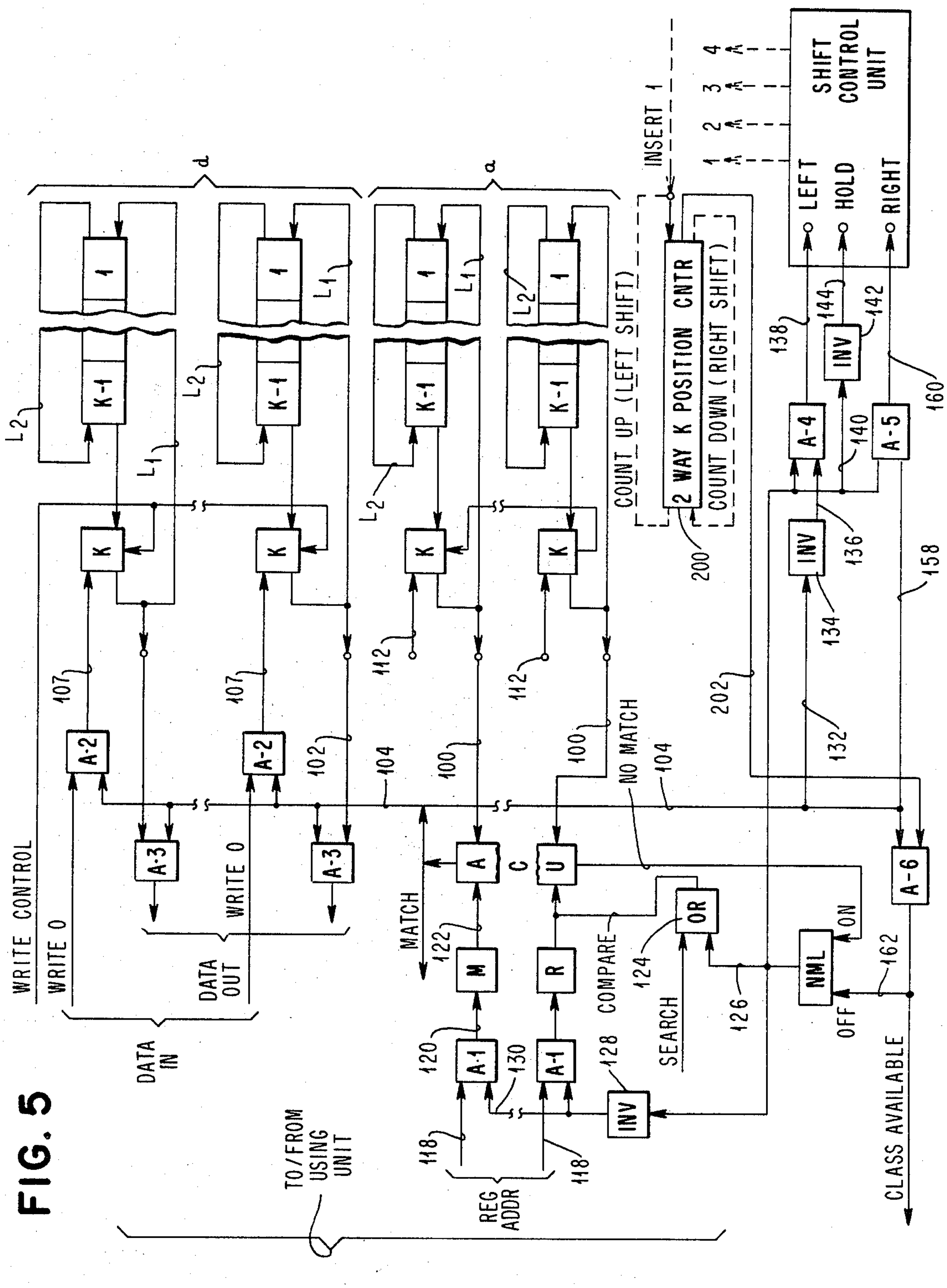
FIG. 5 shows in block diagram controls for operating the registers of the embodiment of FIGS. 1–4 and for reordering their pages according to the invention.

FIG. 5 shows control circuitry for the registers of a class according to the embodiment diagrammatically illustrated in FIGS. 1 and 2, utilizing shift registers and connections according to FIGS. 3 and 4. There are *d* address registers (first and last only shown, *a* address register (first and last only shown), K—1 (nearest) and 1 (most remote) being shown. The two shift loops for the registers are designated as in FIG. 2, $L_1$ for the left shift loop including position K, and $L_2$ for the right shift loop excluding position K.

The address bits of the K position of the address registers are applied over lines 100 to corresponding terminals of an Address Comparison Unit labeled ACU. Each K position bit of the data registers has an output line from its output circuitry of FIG. 4 to an AND gate designated A-3, the other terminal of which is conditioned from a line 104; and two input lines 107 from two AND gates A-2 which are connected respectively to the in-lines of each bit shift register. The A-3 AND gates have DATA OUT lines 108 for transmitting the data from the corresponding K positions of the data registers to the using unit of the system. The A-2 AND gates have input lines WRITE 0 from the data source of the system which condition one terminal of these respective AND gates, the other terminal thereof being conditioned from line 104. (The input lines (not shown) to input terminals 112 of the K positions of the address registers would be utilized only when initially loading all registers of the class and may, for example, come from a counter).

A using unit requesting access to a page sends each of the address bits thereof over lines 118 to AND gates A-1 which are conditioned as hereinafter explained and from which the bits are passed by lines 120 to corresponding bit positions of a Memory Address Register labeled MAR. The bits from the MAR are in turn applied to corresponding terminals of the Address Comparison Unit ACU by lines 122. While only two of the lines and gates mentioned in the preceding sentence are shown in FIG. 5, these corresponding to the two-out-of-*a* address register shown, it will be understood that there will be *a* such lines and gates.

The ACU may utilize conventional comparison circuitry which produces an output on a line labeled NO MATCH when any of the compared bits are not the same and an output to a line labeled MATCH when all compared bits are the same. The ACU circuitry shown in FIG. 5A is hereinafter described. The MAR is a conventional storage register which applied its 1 or 0 bit values to lines 122.

Simultaneously with loading the MAR, the using unit sends a signal on a line labeled SEARCH which, through OR gate 124 and a line labeled COMPARE, activates the comparison circuitry. If the requested address is that of the last accessed page, that page will be in position K and the ACU will provide an output to the line labeled MATCH which signals the using unit that the desired page is in access position. Also, the output on the MATCH line goes to line 104 and conditions the AND gates A-2 to apply the data signals, if any, provided by the using unit on the WRITE 0 lines to the input circuitry of the K position data cells. The MATCH signal on line 104 also conditions the AND gates A-3 for readout, so that the using unit can read or write at its election. The MATCH output to line 104 also conditions one terminal of AND gate A-6 the other terminal of which is conditioned by the 2 WAY K POSITION COUNTER to provide a signal to the using unit on a line labeled CLASS AVAILABLE, signifying that the using unit may start another search as soon as it has completed its read or write operation. Read/write gates A-2 and A-3 will remain conditioned as long as the using unit conditions the SEARCH line.

If the requested address is not in the K position, the resultant ACU output on the NO MATCH line turns on a No Match Latch designated NML in the drawing. The output from the latch NML to a line labeled NML "ON" goes via line 126 to OR gate 124 to lock the ACU in search-compare condition. Also, the requested address input gates A-1, previously conditioned from the NML "ON" line through inverter 128 and line 130, since the NML latch was off, are now deconditioned by the output on NML "ON." The output on line NML "ON" also conditions one terminal of AND gates A-4, the other terminal of which is conditioned by the absence of a MATCH output on line 104 by line 132, inverter 134 and line 136. The output of gate A-4 on line 138 is applied to the shift left lines of the shift control circuitry of FIG. 4 as indicated in FIG. 5 by the block labeled SHIFT CONTROL UNIT and its terminal labeled "LEFT" to which line 138 is connected. The HOLD control liens of the shift control circuitry, previously activated by absence of output on the NML "ON" line via line 140, inverter 142 and line 144 to the HOLD input of the SHIFT CONTROL UNIT, are now inactivated by the inverted output from line NML "ON".

The block 200 labeled 2 WAY K POSITION COUNTER in FIG. 5 may be any suitable counter capable of counting in one direction as "up" the number of left shifts of the shift circuitry on a search until the desired page is found, and then counting in the reverse direction or "down" until the count returns to zero which is signalled by an output.

Also, if the first left shift produces a successful comparison, the MATCH output signals the using unit and conditions the read and write gates as previously described. In addition the MATCH output on line 104 deconditions AND gate A-4 by reason of inverter 134 and conditions one terminal of AND gate A-5 via line 158, the other terminal of which is conditioned by the latch output on the line NML "ON". Gate A-5 conditions the SHIFT RIGHT lines of FIG. 4 to cause a first shift right as indicated on FIG. 5 by the line 160 connecting gate A-5 to the RIGHT terminal of the SHIFT CONTROL UNIT. Since it is here assumed that the desired page was found on the first left shift, the first right shift moves the page last previously in the access K position, from position 1 to position K—1, while position K remains in the HOLD state for access by reason of the connections to the right shift controls in FIG. 4.

The output from gate A-6 turns off the NML latch via line 162 to its OFF terminal and sends the CLASS AVAILABLE signal to the using unit. The absence of output on the NML "ON" line deconditions gate A-5, maintains gate A-4 deconditioned, and restores all register positions to HOLD via line 140, inverter 142, line 144 and the HOLD connections of FIG. 4.

It will be appreciated that when the desired page is not located by the first and second comparisons, the left shift continues until the desired page reaches position K, because the presence of output on the NML "ON" line and the absence of output on line 104 maintain gate A-4 conditioned and gate A-5 and the HOLD connections deconditioned. The resultant MATCH output then produces the same operations just described for the case of a match on the first shift, except that the number of right shifts will be more than one and equal to the number of left shifts which were made in locating the desired page.

The comparison circuitry of the ACU illustrated in FIG. 5A utilizes EXCLUSIVE OR gates 170 the two input terminals of which are connected, respectively, to lines 100 from the K position address bits and lines 122 from the MAR address bits. The output lines 172 of gates 170 are connected to an OR gate 174. The output line 176 of the OR gate is connected to one terminal of a first AND gate 178 and, through inverter 180, to one terminal a second AND gate 182. The other terminals of AND gates 178 and 182 are conditioned from the COMPARE line of FIG. 5. An output from gate 178 is applied to the NO MATCH line whereas an output from gate 182 is applied to the MATCH line.

Since a two-terminal EXCLUSIVE OR gate has an output if, and only if, its two inputs are different, any difference between the values of corresponding bits on lines 100 and 122 produces an output from their gate 170 which is applied to line 176 through OR gate 174 and through gate 178 to the NO MATCH line, whereas by reason of inverter 180 there is no output on the MATCH line. When all compared bit values are the same, there is no output from gates 170, OR circuit 174 or gate 178 to the NO MATCH line whereas inverter 180 produces an output from gate 182 on the MATCH line.

When the registers of the class are initially loaded, a logical "1" is inserted in the 1 position cell at the right hand end of the counter, as indicated by the dotted line labeled INSERT 1 in FIG. 5, which is permanently stored in the counter, all other cells being at logical "zero" state.

When the data and address registers are shifted left in FIG. 5 by the conditioning of AND gate A-4 and the left shift control circuitry of FIG. 4, counter 200 is shifted left in unison therewith by the same control circuitry, thus transferring the 1 from position 1 successively to the cells to the left at each shift, thus counting the number of left shifts or counting "up," as indicated by the shift left loop in FIG. 5 labeled COUNT UP (LEFT SHIFT). When the desired page is located and the data and address registers are shifted right by conditioning the right shift circuitry of FIG. 4, counter 200 is shifted to the right in unison with the other registers, as indicated in FIG. 5 by the shift right loop labeled COUNT DOWN (SHIFT RIGHT). When the count down equals the count up the page in the K position at the start of the search will be in position K—1 and the 1 value will have returned to counter position 1 where it is read out on line 202 to gate A-6, including restoring all registers including counter 200 to the HOLD condition.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A K position magnetic domain shift register for the storage of data comprising:

an accessing position K for accessing the register for reading and writing;

(K—1) other positions coupled in a first loop for transferring data between said other positions without placing the data in the accessing position; and control means for inserting and removing said access position into said first loop to form a second loop to transfer data from any one of the (K—1) other positions into the access position for reading or writing whereby data in any bit position can be transferred to the accessing position by the second loop and the data in the other positions can be reordered by the first loop in order of last use.

2. The magnetic domain shift register of claim 1 wherein the transfer of data in the second loop to access the data is in one direction and the transfer of the data in the first loop to reorder the data is in the opposite direction.

3. The magnetic domain shift register of claim 2 including:

a magnetic field means for producing a rotating magnetic field which can be reversed to control the direction of data transfer in the loops.

4. The magnetic domain shift register of claim 3 including:

means in said accessing position K for movement of the data within such accessing position while data is being reordered in said first loop.

5. In K position magnetic domain shift register for the storage of data a first bubble control pattern means for an accessing position K of the register to permit sensing the data in the memory or the placing of new data into the memory;

a second bubble control pattern means for (K—1) other positions of the memory arranged in a loop for transferring data between said other positions without placing data into said accessing position of the memory; and electrical control means for selectively inserting said access positions into said first loop to form a second loop to permit data from any one of the (K—1) other positions to be placed into the access position for reading and writing whereby a bit of data in any of the positions of the memory can be placed in the accessing position of the memory and while said bit of data is in said accessing position the data in the other positions can be reordered in order of last use.

6. The magnetic domain memory of claim 5 wherein:

the transfer of data in the second loop to access the data is in one direction and the transfer of the data in the first loop to reorder the data is in the opposite direction.

7. The magnetic domain memory of claim 1 including:

a magnetic field means for producing a rotating magnetic field which can be reversed to control the direction of data transfer in the loops.

8. The magnetic domain memory of claim 7 including:

a bubble control pattern in said accessing position to cause the movement of the data within said accessing position while data is being reordered in said first loop.

* * * * *